(12) United States Patent
Kolesnik et al.

(10) Patent No.: US 9,851,995 B2
(45) Date of Patent: Dec. 26, 2017

(54) HYPERVISOR ADJUSTMENT FOR HOST TRANSFER BETWEEN CLUSTERS

(71) Applicant: Red Hat Israel, Ltd., Raanana (IL)

(72) Inventors: Michael Kolesnik, Ramat Gan (IL); Moti Asayag, Netanya (IL)

(73) Assignee: Red Hat Israel, Ltd., Raanana (IL)

( * ) Notice: Subject to any disclaimer, the term of this patent is extended or adjusted under 35 U.S.C. 154(b) by 332 days.

(21) Appl. No.: 14/632,994

(22) Filed: Feb. 26, 2015

(65) Prior Publication Data
US 2016/0253194 A1    Sep. 1, 2016

(51) Int. Cl.
G06F 9/455 (2006.01)
G06F 9/445 (2006.01)

(52) U.S. Cl.
CPC ...... *G06F 9/45558* (2013.01); *G06F 9/45533* (2013.01); *G06F 9/44505* (2013.01); *G06F 2009/4557* (2013.01)

(58) Field of Classification Search
CPC ............. G06F 9/45558; G06F 9/45533; G06F 9/44505; G06F 2009/4557
See application file for complete search history.

(56) References Cited

U.S. PATENT DOCUMENTS

| | | |
|---|---|---|
| 5,659,786 A | 8/1997 | George et al. |
| 8,533,305 B1 | 9/2013 | Keagy et al. |
| 8,621,463 B2 | 12/2013 | Fuhrman et al. |
| 8,639,787 B2 | 1/2014 | Lagergren et al. |
| 2010/0070970 A1 | 3/2010 | Hu et al. |
| 2011/0191477 A1* | 8/2011 | Zhang ............ G06F 15/173 709/226 |
| 2011/0307886 A1* | 12/2011 | Thanga ............ G06F 9/5077 718/1 |
| 2012/0072909 A1* | 3/2012 | Malik ............ H04L 12/4641 718/1 |

(Continued)

OTHER PUBLICATIONS

Szefer et al., "Architectural Support for Hypervisor-Secure Virtualization," Proceedings of the International Conference on Architectural Support for Programming Languages and Operating Systems (ASPLOS), 13 pages, Mar. 2012.

(Continued)

*Primary Examiner* — James J Lee
(74) *Attorney, Agent, or Firm* — Lowenstein Sandler LLP

(57) ABSTRACT

A method for moving a hypervisor in a data grid. The method can include, receiving, from a system administrator, a request to move a host from a first cluster to a second cluster in a data grid, wherein a hypervisor is registered at the host to manage the host. The method can further include identifying, by the virtualization manager, a first configuration of the first cluster. The method can further include identifying, by the virtualization manager, a second configuration of the second cluster. The method can further include determining, by the virtualization manager, differences between the first configuration and the second configuration. The method can further include identifying current configuration attributes of the hypervisor associated with the first cluster. The method can further include adjusting, by the virtualization manager, configuration attributes of the hypervisor that differ for the configuration of the second cluster.

15 Claims, 4 Drawing Sheets

(56) References Cited

U.S. PATENT DOCUMENTS

| | | | |
|---|---|---|---|
| 2012/0159234 A1* | 6/2012 | Mehta | H04L 41/0663 714/4.11 |
| 2013/0067465 A1* | 3/2013 | Fuhrman | G06F 9/5077 718/1 |
| 2013/0139154 A1* | 5/2013 | Shah | G06F 9/45558 718/1 |
| 2013/0139155 A1* | 5/2013 | Shah | G06F 9/45558 718/1 |
| 2013/0339947 A1 | 12/2013 | Neary et al. | |
| 2014/0215466 A1 | 7/2014 | Khasnabish | |
| 2014/0223225 A1 | 8/2014 | Heyrman et al. | |
| 2015/0212840 A1* | 7/2015 | Biran | G06F 9/45558 718/1 |
| 2015/0324216 A1* | 11/2015 | Sizemore | G06F 9/45558 718/1 |
| 2015/0324217 A1* | 11/2015 | Shilmover | G06F 9/45558 718/1 |
| 2015/0372867 A1* | 12/2015 | Amann | H04L 41/082 709/221 |
| 2016/0239350 A1* | 8/2016 | Kamawat | G06F 11/1425 |

OTHER PUBLICATIONS

VMware, Inc., "Managing Multi-Hypervisor Environments with vCenter Server," http://www.vmware.com/pdf/vcenter-multi-hypervisor-manager-10-guide.pdf, 46 pages, Mar. 2012.

Laverick, "Multi-Hypervisor Management and VM Conversion—Time to Stop Kicking the Tyres?," http://www.mikelaverick.com/2013/09/vcenter-multi-hypervisor-manager-mhm-with-windows-hyper-v-2012/, 23 pages, Sep. 23, 2013.

* cited by examiner

HYPERVISOR ADJUSTMENT FOR HOST TRANSFER BETWEEN CLUSTERS

TECHNICAL FIELD

The present disclosure pertains to computer systems; more specifically, to transferring of hypervisors in a data grid.

BACKGROUND

Data, such as software programs, information, or other forms of information, has become a resource and asset for individuals and businesses. As an amount of data used and stored by individuals and businesses continues to increase, traditional personal computers (PCs) and other computing devices may not have sufficient storage and processing capacity to store and process the data. A data center can be a collection of servers with increased computing power and storage capacity. A data grid may be a distributed computing system including multiple data centers. As storage and processing demands by individuals and businesses vary, resources of the data centers or data grids can be shift to meet the varying demands.

DESCRIPTION OF EMBODIMENTS

Figure 1:
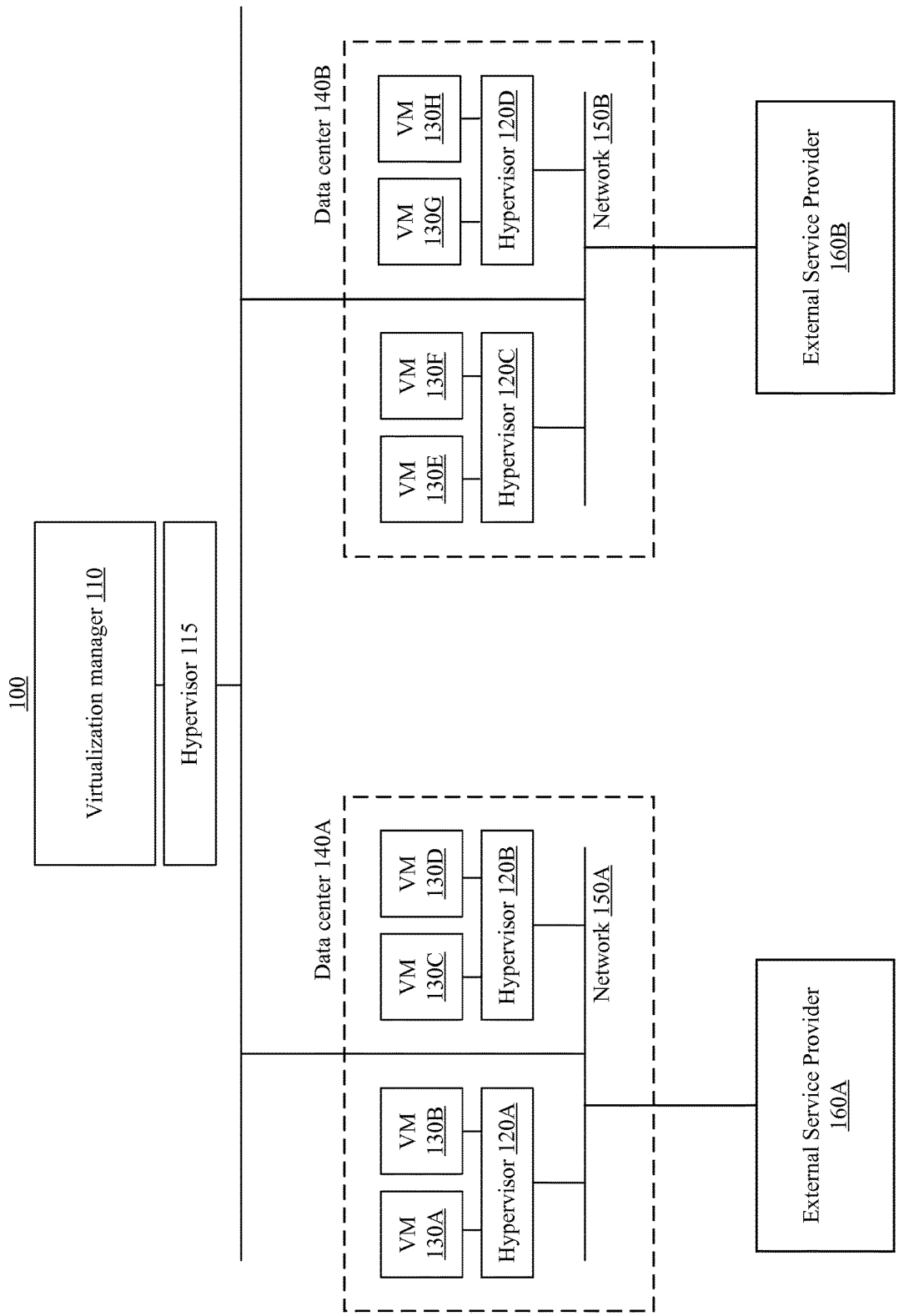
FIG. 1 depicts a distributed computer system representing a virtualization environment according to one embodiment.

Data grid technologies are described herein.

Individuals or businesses may store data on a single machine or a single server to provide a fixed and definite location of the data. As the amount of data stored and used by individuals and businesses increases, maintaining the data at a single machine or server can become difficult. Organizations may use a data grid to store large amounts of data and/or access data owned and stored by multiple organizations. Data grids can manage distributed data, where the data can be stored across different locations and/or using different types of storage devices. A data grid can include data centers. A data center can include a selected group of nodes or servers (e.g., clusters).

A data center can be container for physical and logical resources within a managed virtual environment, including hosts, hypervisors, virtual machines, networks, and external service providers. A data center can support multiple hosts. A host can be a device, such as a computer system, that can run one or more virtual machines. The host can comprise various hardware components (such as a processor, memory storage device, and network input/output device). The host can execute a hypervisor, which may comprise one or more software modules employed to manage hardware devices and virtual machines. As demands (such as data storage or processing demands) in different data centers may change, certain hosts can be moved among clusters in a data center or among data centers in a data grid. For example, if the demand on a data center increases, such as when client initiates computational or resource intensive tasks, one or more hosts can be moved to the data center to provide additional resources to the data center.

In certain implementations, in order to move a host to a new cluster or data center, a user may need to manually switch the hypervisor being executed by the host to a maintenance mode and delete certain configuration information (including drivers, software, and so forth) that may have been previously installed or registered at the hypervisor. When the hypervisor has been so scrubbed, the user can manually configure the hypervisor to be used at a new cluster within the same data center as the host of the hypervisor is currently located or at a cluster at a different data center in the network system, by installing drivers and software compatible with the new cluster or data center. When the hypervisor has been configured, the virtualization manager may register the host at the new cluster or data center. However, the process of scrubbing and manually configuring a hypervisor for a new cluster or data center can be time-consuming and prone to errors.

Aspects of the present disclosure address the above noted and other deficiencies by adjusting configuration attributes of the hypervisor when the host need to be moved to a new cluster within a same data center as the host of the hypervisor is currently located or at a cluster of at a different or data center. Numerous configuration attributes, drivers, and software that a hypervisor uses at a current cluster or data center may be the same or compatible with other clusters or data centers. The same or compatible configuration attributes, drivers, and software may be preserved (e.g., not removed or scrubbed) at the hypervisor when the host may be transferred between clusters or data centers. A virtualization manager can determine the difference in configuration attributes for the hypervisor at the current cluster or data center and at the new cluster or data center. The virtualization manager can adjust the configuration attributes that differ between the current cluster or data center and the new cluster or data center.

FIG. 1 depicts a distributed computer system 100 representing a virtualization environment. The distributed computer system 100 (such as a data grid) can include a virtualization manager 110, a hypervisor 115, and hypervisors 120A-120D grouped into one or more logical groups 140A-140B (e.g., data centers). The virtualization manager 110 can be software executed by a hypervisor 115 for centralized management of the virtualization environment. The virtualization manager 110 may include various interfaces, such as administrative interfaces, reporting interfaces, and/or application programming interfaces (APIs) to communicate to hypervisor 120A-120D of the managed virtualized environment. The virtualization manager 110 may also include user portals, databases, and directory servers.

The hypervisors 115 and 120A-120D may manage one or more virtual machines 130A-130H, respectively, by abstracting a physical layer, including processors, memory, and I/O devices, and presenting the abstracted physical layer to the virtual machines as virtual devices. The hypervisors can manage the host by abstracting other layers (e.g., creating and allocating networks, storage, various configurations, running programs). The hypervisors can be managed by the virtualization manager 110. The virtual machines 130A-130H may execute guest operating systems (OSs) that can use the virtual devices, including virtual processors, virtual memory, and virtual I/O devices. One or more applications may be running on virtual machine 130A-130H under the guest OSs.

The data centers 140A and 140B may be coupled, via networks 150A and 150B, to one or more external service providers 160A and 160B. The external service providers 160A and 160B can provide virtual machines with services external to the virtualization environment 100 (e.g., external services). The external services can be services not natively offered by the virtualization environment 100. The external services can include networking services, storage services, virtual machine (VM) hosting services, load balancing services, virtual private network (VPN) services, computational services (e.g., offloading of processor-intensive VM processes), and so forth. The external services can include virtual services and/or non-virtual services (e.g., physically-based services). The virtualization manager 110, hypervisors 115 and 120A-120D, and virtual machines 130A-130H in the virtualization environment 100 can use the external services.

Figure 2:
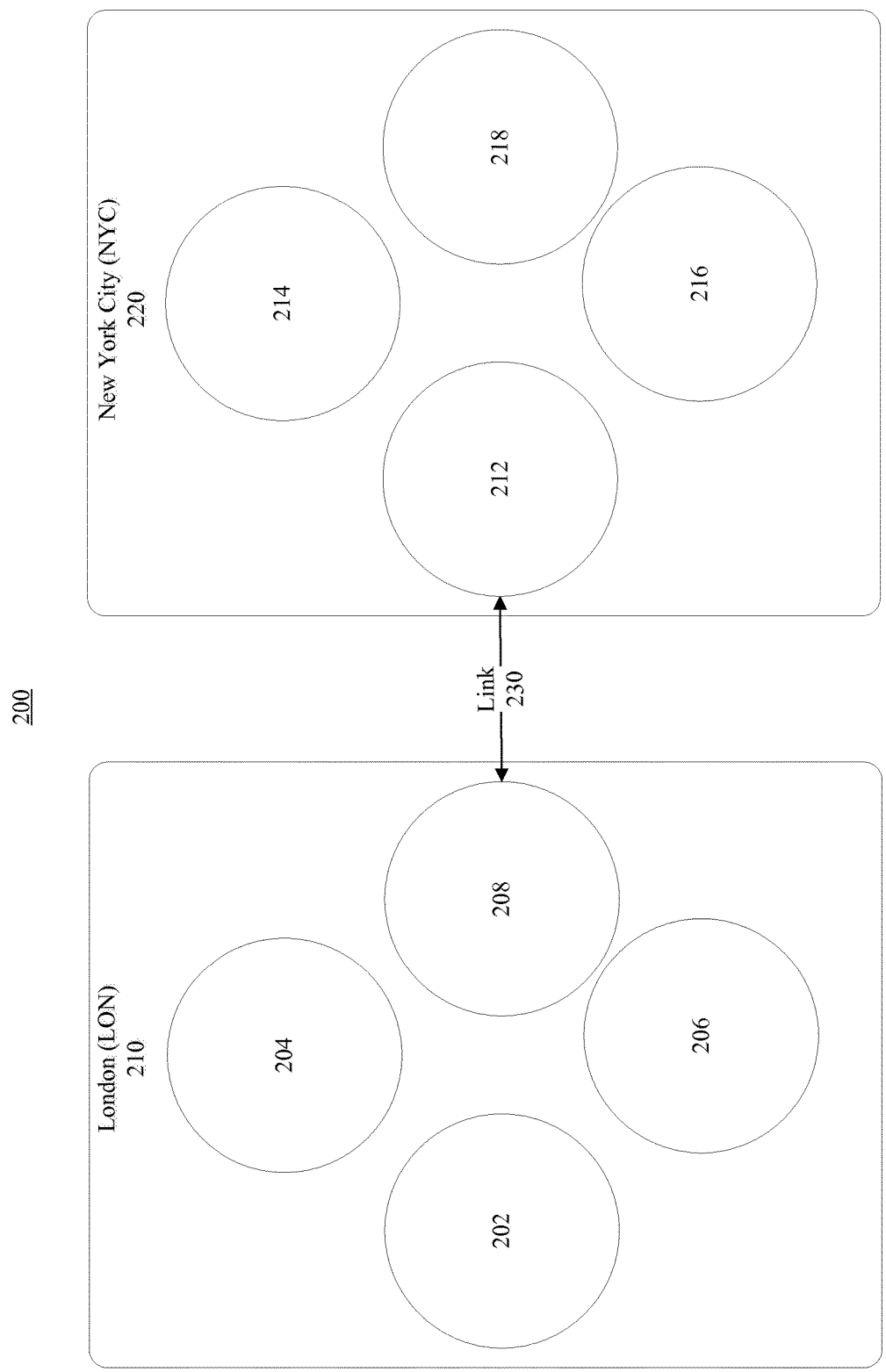
FIG. 2 illustrates a virtualization environment with multiple data center and clusters according to one embodiment.

FIG. 2 illustrates a virtualization environment 200 with multiple data center 210 and 220 and clusters 202-208 and 212-218, respectively. FIG. 2 further illustrates that the data centers 210 and 220 can transfer hosts between the data center 210 and the data center 220. In one example, data center 210 can be located in London (LON) and the data center 220 can be located in New York City (NYC). In this example, data center 210 can transfer a host to the data center 220 from cluster 202, 204, 206, and/or 208. In another example, data center 220 can transfer a host to the data center 210 from cluster 212, 214, 216, and/or 218. The number of data centers and clusters illustrated in FIG. 2 is not intended to be limiting and the number of data centers in a data grid or the number of clusters at a data center can vary.

Hosts can be transferred between data centers 210 and 220 using a link 230 between the data centers. When the hosts may be transferred between the data centers 210 and 220, the networks can be reconfigured so that the host is disassociated from a source cluster and associated with a destination cluster. In one example, the link 230 can use a transmission control protocol (TCP) communications protocol to transfer the hosts with associated hypervisors, where the hypervisors are management software that manages a processor, memory, and other resources at data centers 210 and 220 for virtual machines with the data centers. In another example, the link 230 can use a user datagram protocol (UDP) communication protocol to transfer the hypervisors.

Figure 3:
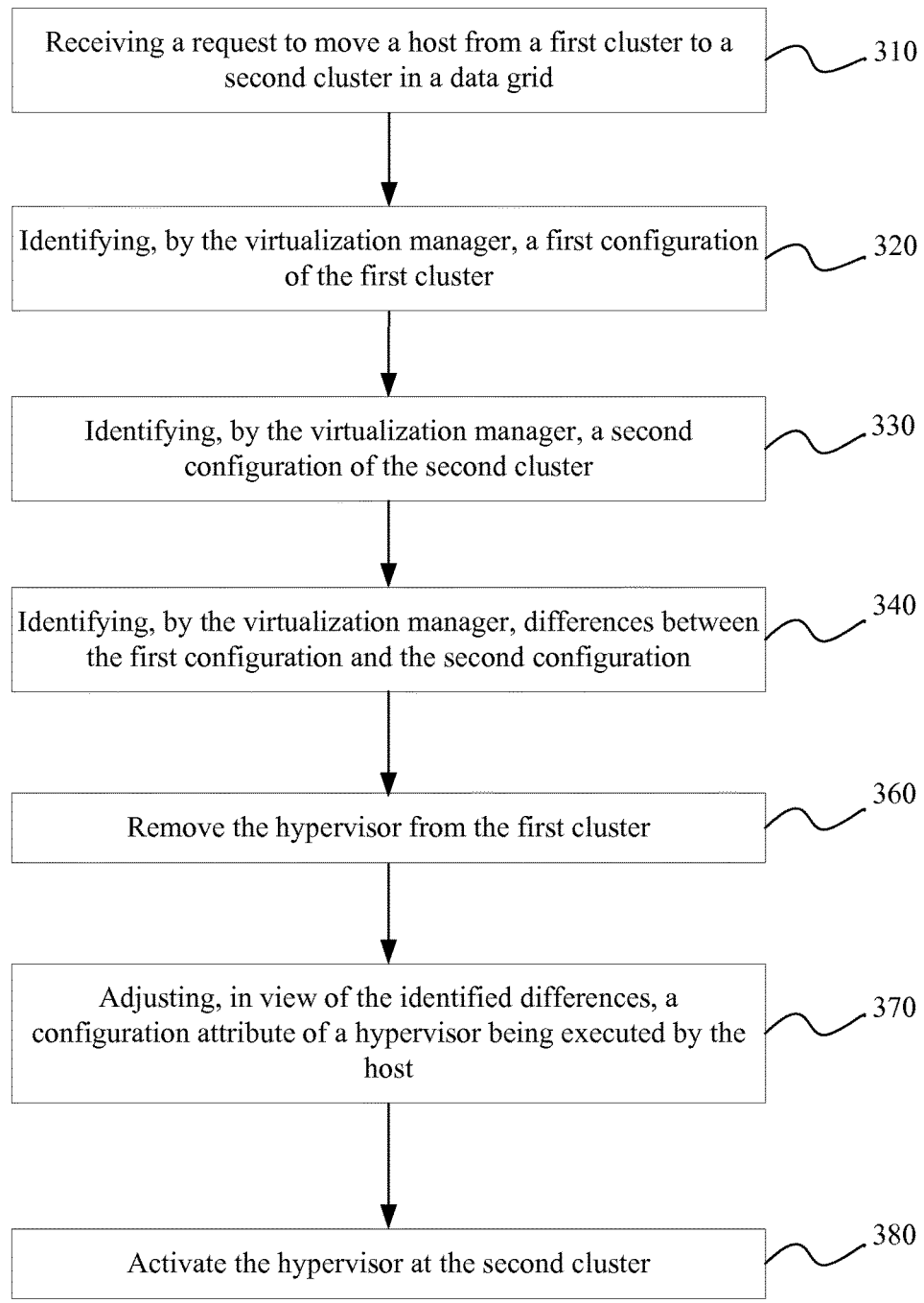
FIG. 3 illustrates a flow diagram of a method for transferring a hypervisor in a virtualization environment according to one embodiment.

FIG. 3 is a flow diagram of a method 300 for transferring a hypervisor in a virtualization environment. Method 300 may be performed by processing logic that may comprise hardware (e.g., circuitry, dedicated logic, programmable logic, microcode, etc.), software (such as operations being performed by the MCU), firmware or a combination thereof. In one example, method 300 is performed by processor, a plurality of processors, a processor core, and/or a plurality of processor cores. Alternatively, other components of a computing system or software executing on the processor may perform some or all of the operations of the method 300.

Referring to FIG. 3, the method 300 can begin by receiving a request to move a host from a first cluster to a second cluster in a data grid (block 310). In one example, the virtualization manager can receive the request from the system administrator to move the hypervisor from a first cluster to a second cluster. In this example, the system administrator can monitor a utilization of resources in different clusters or data centers in a virtualization environment. When resources of a cluster or data center may be reaching full utilization, the system administrator can determine to reallocate a host to the cluster or data center to provide the cluster or data center with additional resources. In another example, the request can include demands or criteria of the cluster or data center, such as resources and services requirements for the hypervisor. For example, the cluster or data center may have demands for a minimum processing power or capability available to hypervisor when the cluster or data center may be performing computationally heavy programs. In another example, the cluster or data center may have demands for a type of network connection associated or available to the hypervisor (such as an external service available to the hypervisor). The virtualization manager can select a host, to transfer to the second cluster, with associated resources and services to meet the demands or criteria.

When the system administrator determines to reallocate the host, the system administrator can send a request to the virtualization manager to move the host. The request can identify the cluster or data center to move the host to. The system administrator can maintain a database or list of hypervisors of the hosts and resources and services associated with the hypervisors.

In one example, a cluster or a data center can be dedicated to a customer in the virtualization environment. When the customer changes their utilization level of the cluster or data center (such as by performing computationally intensive processing) or changes other cluster or data center criteria, the system administrator can identify the changes in the utilization level other cluster or data center criteria and send a request to the virtualization manager to move the host to the dedicated cluster or data center to accommodate for the change in utilization level or other cluster or data center criteria.

In one example, the first cluster can be located at a first data center and the second cluster can be located at a second data center. In another example, the first cluster and the second cluster can be located at the same data center. In this example, when a host may be moved between clusters at the same data center, the hypervisor of the host can use the same management network configuration attributes because the data center is the same (the configuration attributes are discussed greater detail in the proceeding paragraphs).

In another example, the virtualization manager can monitor utilization levels of hypervisors in the virtualization environment. For example, in a virtualization environment, the resources managed by the first hypervisor may operating or utilized by a first host at 25 percent capacity or utilization level and the resources managed by the second hypervisor may operating or utilized by a second host at 95 percent capacity or utilization level. In one example, when the virtualization manager receives a request from the system administrator to move or transfer a host, the virtualization manager can select the first host with a low utilization level. In another example, when the virtualization manager receives a request from the system administrator to move or transfer a host, the virtualization manager can select a host that may not currently being used.

The method can include identifying, by the virtualization manager, a first configuration of the first cluster (block 320). The method can include identifying, by the virtualization manager, a second configuration of the second cluster (block 330). The configuration attribute can be attributes of the hypervisor for the resources and services available to the host. For example, the configuration attributes can include: networking services settings, such as a setting for a type of network connection to communicate information; storage services settings, such as a format that a storage device may store data; a virtual private network (VPN) services setting, such as providing a communication or firewall setting of a VPN; virtual machine (VM) hosting services, load balancing services, virtual private network (VPN) services, computational services (e.g., offloading of processor-intensive VM processes), and so forth. The resources and services can include virtual services and/or non-virtual services (e.g., physically-based) services. In one example, the resources and services can include external resources and services, such as: networking services, such as network bandwidth or network connections to communicate information; storage services, such as storage capacity to store data on an external storage device; virtual private network (VPN) services, such as providing a VPN to the VM; or processor power resources, such as a processor to run program.

In one example, the virtualization manager can maintain a database or list of configurations the different clusters and/or data centers in the virtualization environment. For example, when the clusters are initially created with a set of resources and services, the virtualization manager can store an identifier in the database identifying the clusters and the associated resources and services. In one example, the virtualization manage can store configuration attributes of the clusters when the clusters are created.

In another example, the virtualization manager can send a request to the first and second clusters or data centers requesting configuration information for the first and second clusters or data centers. In this example, the virtualization manager can receive configuration information for the first and second clusters or data centers and identify the configuration for the first and second clusters or data centers. The method can include identifying, by the virtualization manager, differences between the first configuration and the second configuration (block 340). For example, the virtualization manager can compare the configuration of the first cluster or data center with the configuration of the second cluster or data center to determine the differences.

In another example, to determine the configuration attributes of the first cluster of data center, the virtualization manager can send a request for the configuration attribute directly to the identified hypervisor in the request (as discussed in the preceding paragraphs). In another example, the virtualization manager can communicate with the hypervisors to determine when the resources and services associated with the hypervisors change and update the database or list with the changes. In one example, the virtualization manager can periodically send a request to the hypervisors for any updates or changes to the resources or servers. In another example, the hypervisors can communicate changes to the virtualization manager when the changes occur. An advantage of maintaining the database can be to avoid querying the hypervisors each time a request to move a host is received from the system administrator.

The method can include removing the hypervisor from the first cluster (block 350). The method can include adjusting, in view of the identified differences, a configuration attribute of a hypervisor being executed by the host (block 360). In one example a data grid can include a first cluster and a second cluster. The database (as discussed in the preceding paragraphs) can indicate that a network of the first cluster may be configured with a maximum transmission unit (MTU) 1500 and a virtual local area network (VLAN) 100. The database can indicate that the network of the second cluster may be configured with MTU 1500 and a VLAN 2000. When the host may be transferred from the first cluster to the second cluster, the virtualization manager can compare the network configuration for each of the clusters. The virtualization manager can reconfigure hypervisor of the host to match the network configurations for the second cluster, e.g., reconfigure the hypervisor for the VLAN 2000 configuration attributes and maintain the MTU 1500 configuration attributes (as the MTU 1500 configuration attributes may be the same between the first cluster and the second cluster).

In another example, the first cluster may be configured to use a Neutron® external networking service. The Neutron® external networking service can be a pluggable, scalable and application programming interface (API) driven system for managing networks and internet protocol (IP) addresses. The Neutron® external networking service can provide a variety of network services ranging including L3 forwarding, load balancing, and edge firewalls. The second cluster many not include Neutron® external networking service. In this example, the virtualization manager can compare the external networking service of the first cluster and the second cluster and remove configuration attributes at the hypervisor for the Neutron® external networking service.

In one example, the services of the host can include external services, such as software services, networking services, security services, and/or storage services. For example, the software services can be a software driver or controller to manage or connect with an external device (such as an external server or network interface). Software services configuration attributes of the hypervisor can be adjusted to remove software that is unnecessary for the hypervisor at the second cluster and install software for the hypervisor to use when operating at the second cluster. Unnecessary software can be drivers or controllers that may not be used by the second cluster.

In one example, the virtualization manager can remove the drivers from the hypervisor when the second cluster may not use resources and services requiring the drivers or controllers and install new drivers or controllers for the hypervisor at the second cluster. In another example, the virtualization manager can adjust the drivers or controllers of the hypervisor to be compatible with the drivers or controllers to be used by the hypervisor at the second cluster. For example, the hypervisor may have been configured to use external services in the first cluster. In this example, the second cluster may not use external services and the virtualization manager can adjust the hypervisor to remove the software associated with the external services used at the first cluster and install new software at the hypervisor that may be associated with the second cluster.

The networking services configuration attributes of the hypervisor can be adjusted to remove unnecessary network configuration attributes and add new network configuration attributes for the networks used by the second cluster. For example, the hypervisor can initially be configured to operate using a wireless fidelity (Wi-Fi) network at the first cluster. In this example, the second cluster may use a cellular network and the hypervisor can be adjusted to remove the Wi-Fi network configuration attributes and use the cellular network configuration attributes.

The security services configuration attributes of the hypervisor (such as firewall or user privacy settings) can be adjusted from the security level settings of the first cluster to security level setting matching a security level of the second cluster. The hypervisor can have different security configuration based on the traffic the hypervisor may receive at a cluster. For example, when the hypervisor may be at the first cluster, the hypervisor may receive secure and sensitive information and use a high security setting for a virtual firewall (VF). A virtual firewall (VF) can be a network firewall service or appliance running within a virtualized environment and can provide packet filtering and monitoring provided via a physical network firewall. The VF can be a managed kernel process running within the hypervisor. In this example, when the hypervisor may be at the second cluster, the hypervisor may receive unsecure data and use a low security setting for the firewall. When the hypervisor moves from the first cluster to the second cluster, the security setting for the firewall may be adjusted from a high security setting to a low security setting.

The storage services of the hypervisor can be adjusted to the storage settings for the second cluster. For example, at the first cluster the hypervisor may be set to store virtual machine images locally in the first cluster. In this example, at the second cluster the hypervisor may manage virtual machine images using an external storage server. When the hypervisor is moved from the first cluster to the second cluster, the storage settings can be changed or adjusted from local image storage to external image storage.

Figure 4:
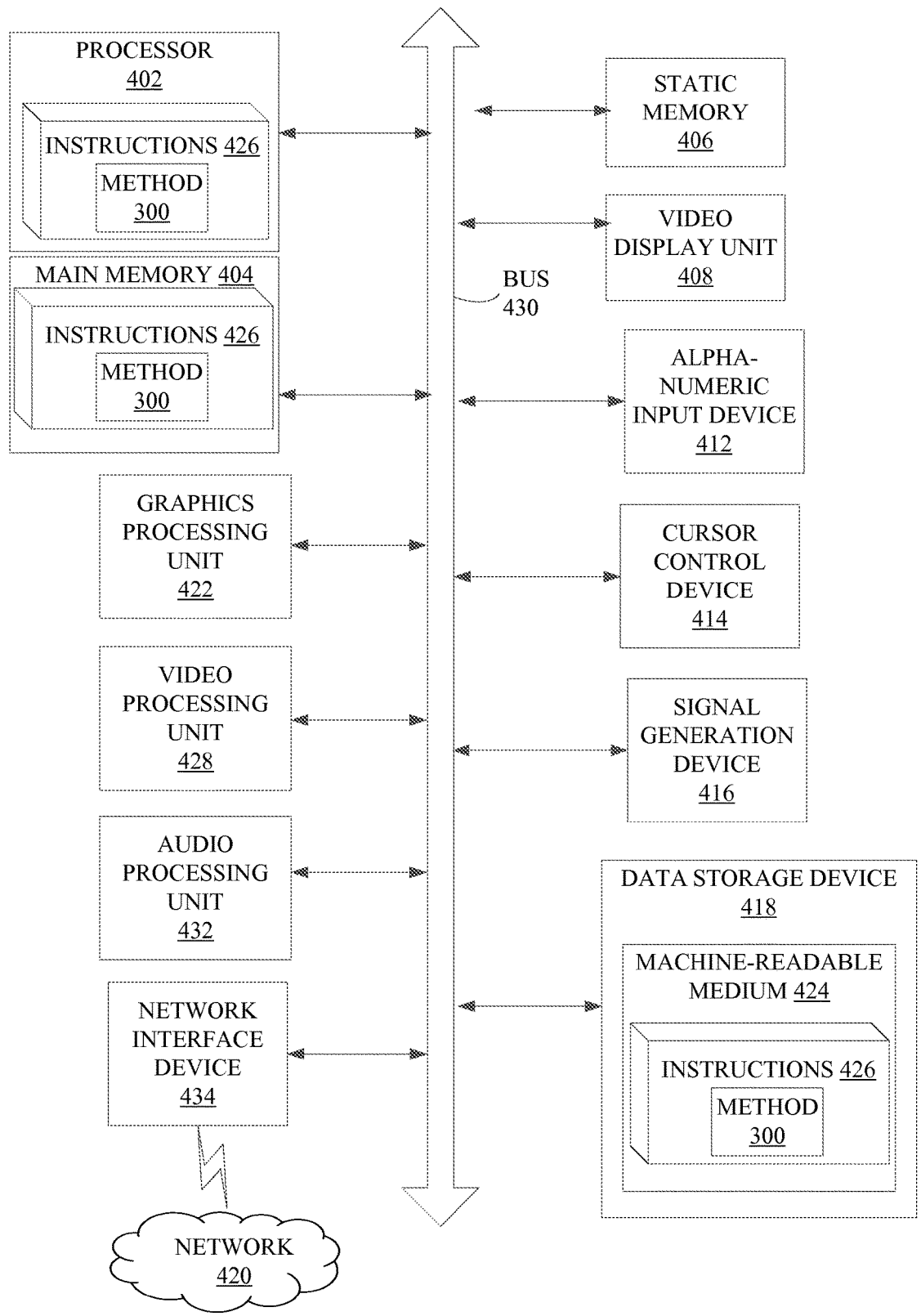
FIG. 4 illustrates a block diagram of one implementation of a computer system.

The method can include activating the hypervisor at the second cluster (block 370). An advantage of adjusting the configuration attributes of the hypervisor based on the difference configurations of the clusters can be to reduce an amount of time to move a hypervisor and increase an efficiency in moving the hypervisor by reducing an amount of configuration attributes to be changed. For example, the virtualization manager can maintain configuration attributes (such as drivers or controllers) that may be common to both the first cluster and the second cluster and adjust or replace configuration attributes of the hypervisor for configuration attributes that differ between the first cluster and the second cluster FIG. 4 illustrates a diagrammatic representation of a machine in the exemplary form of a computer system 400 within which a set of instructions for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein, such as the method 300 for transferring a hypervisor in a virtualization environment.

The computer system 400 may further include a network interface device 422. The computer system 400 also may include a video display unit 408 (e.g., a liquid crystal display (LCD), a cathode ray tube (CRT), or a touch screen), an alphanumeric input device 412 (e.g., a keyboard), a cursor control device 414 (e.g., a mouse), and a signal generation device 416 (e.g., a speaker).

The data storage device 418 may include a computer-readable storage medium 424 on which is stored one or more sets of instructions 426 (e.g., software) embodying any one or more of the methodologies or functions described herein. The instructions 426 may also reside, completely or at least partially, within the main memory 404 and/or within the processor 402 during execution thereof by the computer system 400, the main memory 404 and the processor 402 also constituting computer-readable storage media. The instructions 426 may further be transmitted or received over a network 420 via the network interface device 434.

While the computer-readable storage medium 424 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A computer-readable non-transitory storage medium comprising executable instructions that, when executed by a processing device executing a virtual machine manager, cause the processing device to perform operations, comprising:

receiving a request to move a host from a first cluster to a second cluster in a data grid;
identifying, by the virtualization manager, a first configuration of the first cluster;
identifying, by the virtualization manager, a second configuration of the second cluster;
identifying, by the virtualization manager, differences between the first configuration and the second configuration;
removing, by the virtualization manager, the host from the first cluster;
adjusting, in view of the identified differences, configuration attributes of a hypervisor being executed by the host, wherein the configuration attributes comprise at least one of drivers or settings of the hypervisor; and
activating, by the virtualization manager, the host at the second cluster with the adjusted configuration attributes of the hypervisor.

2. The computer-readable non-transitory storage medium of claim 1, wherein the configuration attributes are provided by at least one of: network configuration parameters, storage configuration parameters, memory configuration parameters, or processor configuration parameters.

3. The computer-readable non-transitory storage medium of claim 1, wherein the operations further comprise maintaining, by the virtualization manager, a database of configuration attributes associated with a plurality of clusters in the data grid.

4. The computer-readable non-transitory storage medium of claim 3, wherein the first configuration and the second configuration are identified using the database.

5. The computer-readable non-transitory storage medium of claim 1, wherein the operations further comprise maintaining, by the virtualization manager, the configuration attributes of the hypervisor that are the same for the first cluster and the second cluster.

6. The computer-readable non-transitory storage medium of claim 1, wherein the first cluster is at a first data center and the second cluster is at a second data center in the data grid.

7. A method, comprising:

receiving a request to move a host from a first cluster to a second cluster in a data grid;
identifying, by a virtualization manager, a first configuration of the first cluster;
identifying, by the virtualization manager, a second configuration of the second cluster;
identifying, by the virtualization manager, differences between the first configuration and the second configuration;
removing, by the virtualization manager, the host from the first cluster;
adjusting, in view of the identified differences, configuration attributes of a hypervisor being executed by the host, wherein the configuration attributes comprise at least one of drivers or settings of the hypervisor; and
activating, by the virtualization manager, the host at the second cluster with the adjusted configuration attributes of the hypervisor.

8. The method of claim 7, wherein the configuration attributes comprise values of at least one of parameters of the hypervisor.

9. The method of claim 7, further comprising maintaining, by the virtualization manager, a database of configuration attributes associated with a plurality of clusters in the data grid.

10. The method of claim 9, wherein the first configuration and the second configuration are identified using the database.

11. The method of claim 7, further comprising, maintaining, by the virtualization manager, the configuration attributes of the hypervisor that are the same for the first cluster and the second cluster.

12. The method of claim 7, wherein the first cluster is at a first data center and the second cluster is at a second data center in the data grid.

13. A system comprising:
a memory; and
a processing device, coupled to the memory, the processing device to:
receive, from a system administrator, a request to move a host from a first cluster to a second cluster in a data grid, wherein a hypervisor is registered at the host to manage the host;
identify, by a virtualization manager, a first configuration of the first cluster;
identify, by the virtualization manager, a second configuration of the second cluster;
determine, by the virtualization manager, differences between the first configuration and the second configuration;
identify current configuration attributes of the hypervisor associated with the first cluster;
removing, by the virtualization manager, the host from the first cluster;
adjust, by the virtualization manager, configuration attributes of the hypervisor that differ for the configuration of the second cluster, wherein the configuration attributes comprise at least one of drivers or settings of the hypervisor; and
activating, by the virtualization manager, the host at the second cluster with the adjusted configuration attributes of the hypervisor.

14. The system of claim 13, the processing device further to: maintain, by the virtualization manager, a database of configuration attributes associated with a plurality of clusters in the data grid.

15. The system of claim 14, wherein the first configuration and the second configuration are identified using the database.

* * * * *